United States Patent [19]
Decker et al.

[11] Patent Number: 5,419,178
[45] Date of Patent: *May 30, 1995

[54] EXHAUST-GAS ANALYZER

[75] Inventors: Hans-Josef Decker, Ronnenberg-Empelde; Horst Horn, Springe, both of Germany

[73] Assignee: Siemens Aktiengesellschaft, Germany

[*] Notice: The portion of the term of this patent subsequent to Jun. 15, 2010 has been disclaimed.

[21] Appl. No.: 44,784

[22] Filed: Apr. 12, 1993

Related U.S. Application Data

[63] Continuation-in-part of Ser. No. 699,746, May 14, 1991, Pat. No. 5,218,857.

[30] Foreign Application Priority Data

May 14, 1990 [DE] Germany ............ 40 17 472.7

[51] Int. Cl.⁶ .............................................. G01N 1/22
[52] U.S. Cl. ................................. 73/23.31; 73/863.11
[58] Field of Search ............................ 73/23.31, 863.11

[56] References Cited

U.S. PATENT DOCUMENTS

| | | | |
|---|---|---|---|
| 3,603,155 | 9/1971 | Morris et al. | 73/23.31 X |
| 3,699,814 | 10/1972 | Kaufman | 73/863.11 |
| 3,965,749 | 6/1976 | Hadden et al. | 73/23.31 |
| 4,586,367 | 5/1986 | Lewis | 73/23.31 X |
| 5,184,501 | 2/1993 | Lewis et al. | 73/23.31 |

FOREIGN PATENT DOCUMENTS

| | | | |
|---|---|---|---|
| 162231 | 6/1990 | Japan | 73/23.31 |
| 1280474 | 12/1986 | U.S.S.R. | 73/23.31 |

*Primary Examiner*—Hezron E. Williams
*Assistant Examiner*—Michael J. Brock
*Attorney, Agent, or Firm*—Kenyon & Kenyon

[57] ABSTRACT

An exhaust-gas analyzer, particularly for emissions testing of motor-vehicle engines has a sampling tube into which a mixture of exhaust gas and ambient air is fed through gas lines. A gas feed pump is disposed downstream of the sampling tube with a flowmeter inserted in the air line feeding electrical signals to a computing unit. The unit computes instantaneous standard total flow rate, allowing for gas pressure and temperature.

18 Claims, 2 Drawing Sheets

EXHAUST-GAS ANALYZER

CROSS REFERENCE TO RELATED APPLICATIONS

This application is a continuation-in-part of U.S. patent application 07/699,746 filed on May 14, 1991, now U.S. Pat. No. 5,218,857.

BACKGROUND OF THE INVENTION

The present invention relates to an exhaust-gas analyzer, particularly for emissions testing of motor-vehicle engines. More specifically, the present invention is related to an analyzer having a sampling tube into which a mixture of exhaust gas and ambient air is fed through gas lines, a gas feed pump being disposed downstream of the sampling tube.

Many countries require the certification of motor vehicles, especially with respect to engine emissions. Many of the prescribed certification processes require a so-called CVS (constant-volume sampling) dilution system. In this CVS certification procedure, a sample is taken from a predetermined quantity of gas, composed of engine exhaust gas and ambient air. The ratio between exhaust gas and air changes continually because a driving cycle involves different operation modes such as acceleration, deceleration, etc., of the vehicle. Each mode results in different exhaust-gas/air ratios. In the known exhaust-gas analyzers for the CVS certification procedure, an average dilution rate has been used to determine the pollutant concentration. An average dilution rate will necessarily yield only an integrated value. An instantaneous result (in acceleration phases, for example) cannot be ascertained with such a procedure. Erroneous conclusions concerning the actual relationships therefore are not precluded.

SUMMARY OF THE INVENTION

The present invention substitutes direct evaluation for the integrated evaluation employed in the known exhaust-gas analysis. Thus, it is possible to measure the relationship between concentration and quantity of the exhaust gas unambiguously, during each operation mode, that is, in predetermined sampled portions. The present invention further seeks to achieve a simplified and lower-cost design of the exhaust-gas analyzer.

The present invention achieves these results by inserting a flowmeter into the air supply line. The flowmeter delivers electrical signals to a computing unit which computes the instantaneous standard total flow rate and the standardized exhaust gas value. The computing unit then computes a dilution factor based on the instantaneous standard flow rate and the standardized exhaust value. The computing unit compensates for gas pressure and temperature in the gas mixture. This dispenses with the need for an expensive heat exchanger to maintain temperature equalization. Thus, there is no continuous energy consumption for cooling water or heat. A flowmeter in the air supply line, from whose values the standard flow rate is determined, allowing for gas pressure and temperature, provides a surprisingly simple and accurately operating CVS diluting system. For a mass flowmeter, the type of flowmeter used to great advantage, the condition of the air is unimportant. The air must merely be filtered to prevent fouling of the flowmeter based on the mass-flow principle.

The flowmeter is advantageously designed as a vortex-shedding flowmeter and operates on the Kármán vortex street principle. Vortices form at an impingement body with trapezoidal cross section and are alternately shed. The frequency f with which the vortices are shed is directly proportional to the fluid velocity, and hence proportional to the flow rate (volumetric flow rate Q). The measurement obtained is independent of pressure, temperature, density and viscosity of the measured medium, provided that a critical Reynolds number Re is observed. Such vortex flowmeters are known and are mass-produced. Surprisingly, their use yields synergistic advantages with respect to the makeup of the entire exhaust-gas analyzer.

BRIEF DESCRIPTION OF THE DRAWING FIGURE

DETAILED DESCRIPTION

Figure 1:
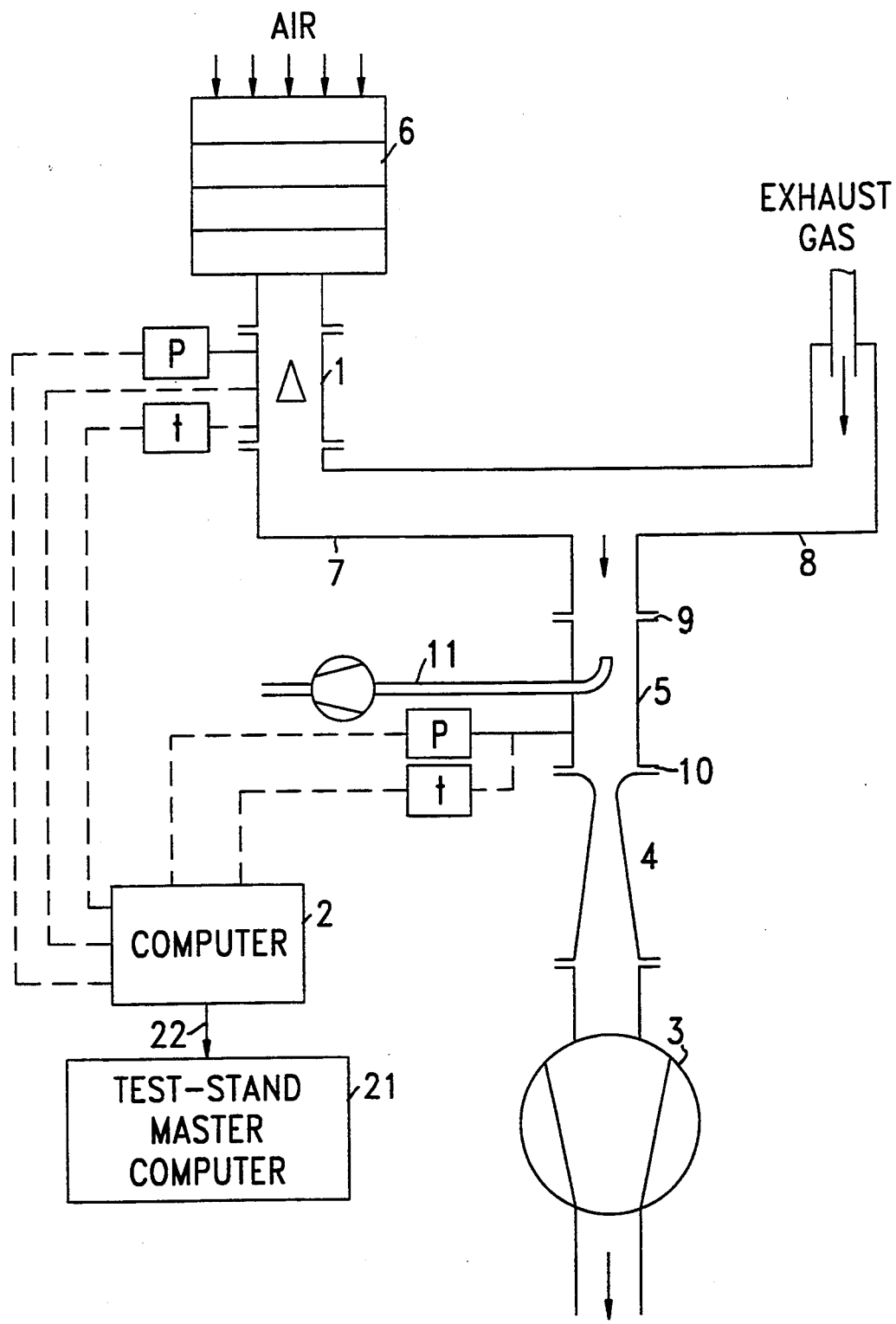
FIG. 1 illustrates a diluting and sampling system in accordance with the present invention.

In FIG. 1, the analyzer includes a flowmeter 1, such as a vortex-breaking flowmeter. The pressure and temperature prevailing in it are continuously measured and electronically compensated. This may be done in the manner shown or in a decentralized manner.

The air measured in the flowmeter 1 is first filtered by means of an air filter 6. The latter may be a cartridge filter or a bag filter. The exhaust gases from the internal-combustion engine being tested arriving through line 8 are combined with the air flowing through the line 7. A pipe 11 withdraws a desired sample portion from a stabilizing section 5. The stabilizing portion 5, at which measuring instruments P and T measure pressure and temperature, is advantageously disposed between flanges 9 and 10. On the inlet side, it may be provided with equalizing elements (not shown), for example, a baffle grid, for the two partial streams of exhaust gas and air brought together. Both the measured value from the flowmeter 1 and the pressure and temperature values are fed to a computing unit 2, which may be a Siemens 16-bit SMP computer, for example, the computing unit determines the instantaneous total flow rate (e.g., in m$^2$/min) through the venturi nozzle 4 in accordance with equation (1) where K is a correction factor {m$^2$ * sqrt (K°) / (min * kPa)}, P is the instantaneous absolute pressure {kPa}, and T is the instantaneous temperature {K°}. The instantaneous standard flow rate (e.g., in m$^2$/min) is then determined in accordance with equation (2) where $P_o$ is a calibration pressure {kPa}, $P_n$ is a standardizing pressure based on environmental regulations {kPa}, $T_o$ is a calibration temperature {K°}, and $T_n$ is a standardizing temperature based on environmental regulations {K°}. The instantaneous standard flow rate through an ambient air probe (e.g., in m$^2$/min) is determined in accordance with equation (3) where L is the instantaneous flow rate through the ambient air probe {m$^2$/min}. The standardized exhaust gas volume can then be determined in accordance with equations (4). Finally, the dilution factor is determined in accordance with equation (5). The computer 2 then sends that information to the test-stand master computer.

$$Q = K \times P \times T^{-0.5} \qquad (1)$$

$$Q_n = \frac{K \times P}{\sqrt{T}} \times \frac{P_o \times T_n}{T_o \times P_n} \qquad (2)$$

-continued $$L_n = L \times \frac{P_o \times T_n}{T_o \times P_n} \quad (3)$$

$$A_n = Q_n - L_n \quad (4)$$
$$A_n = (Q - L) \times \frac{P_o \times T_n}{T_o \times P_n}$$

$$V = \frac{Q_n}{A_n} \quad (5)$$

The stabilizing length or steady flow zone 5, sampled through the pipe 11, is followed by a venturi nozzle 4. That nozzle is a critical nozzle and allows only a constant, maximum flow rate. A gas feed pump 3 is downstream of the nozzle 4. The rated suction capacity of the pump 3 is greater than the maximum mass rate of flow through the exhaust-gas analyzer. This assures constant flow through the exhaust-gas analyzer. Pulsations in the exhaust-gas flow are advantageously dampened, and an accurate instantaneous value can be determined in standard quantities. Because of the smooth flow through the dilution system and the elimination of the heat exchanger with its flow-stabilizing properties, this behavior of the suction side of the dilution system is of particular importance.

Figure 2:
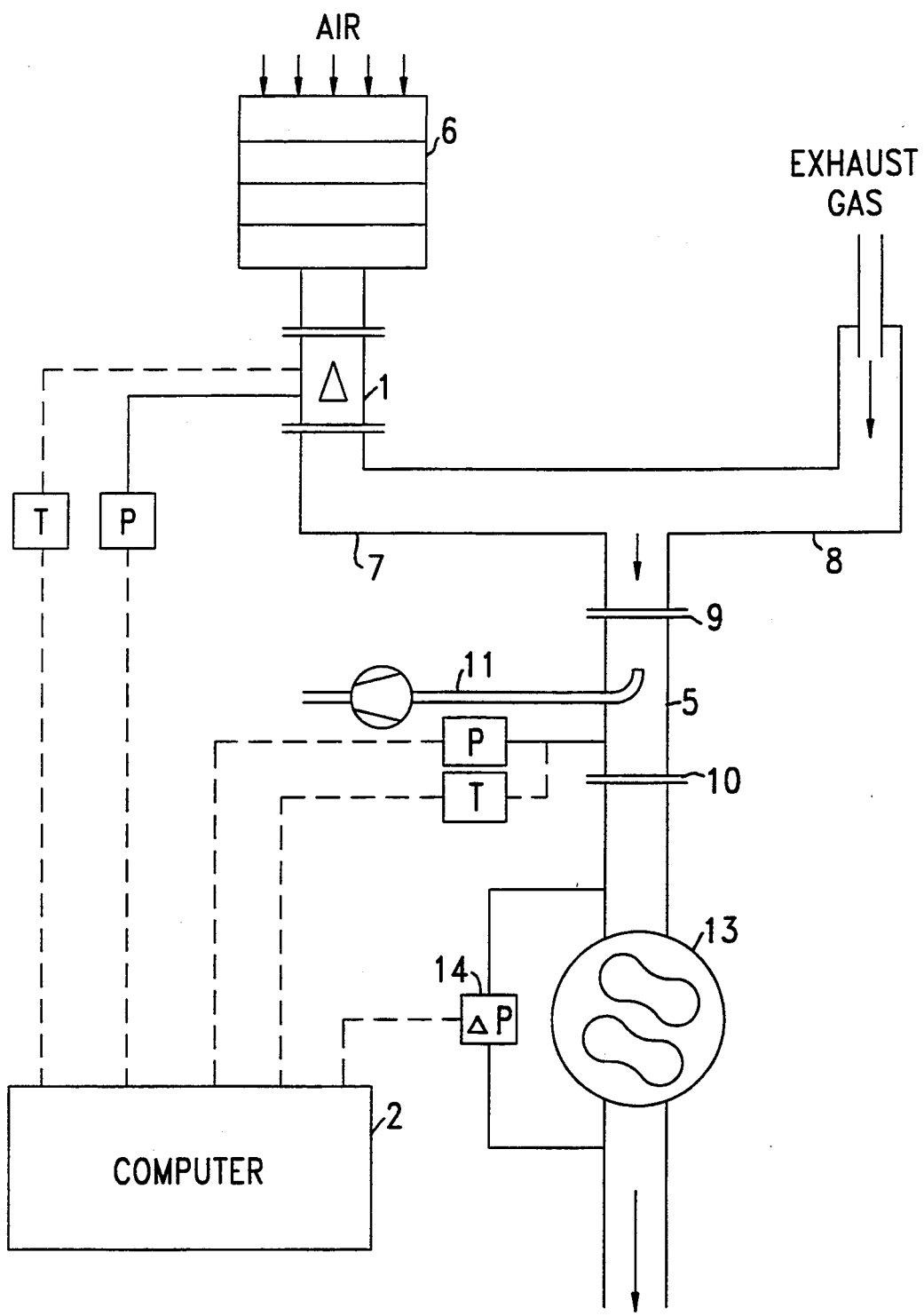
FIG. 2 illustrates an alternative embodiment of the dilution and sampling system of the present invention.

FIG. 2 illustrates an alternative embodiment of the present invention in which a constant flow rate is produced by a displacement pump 13 having a pressure difference 14 across its intake and outlet in place of the venturi nozzle 4 and the gas feed pump 3 of the first embodiment. The displacement pump 13 is preferably a "Root's" blower or "Root's-type" compressor. A means for measuring 14 the pressure difference across the displacement pump 13 is also included.

In this alternative embodiment the dilution factor is computed as follows. The instantaneous flow rate through the displacement pump (e.g., in m2/min) is determined in accordance with equation (6) where D is the rated suction volume per revolution {m2/revolution}, M is a suction volume reduction {m2/min}, A is the RPM of the flow stage {1/min}, B is a factor of the RPM reduction {1/(min * kPa)}, T is the instantaneous temperature {K°}, P is the instantaneous absolute pressure {kPa}, ΔP is the pressure difference across the displacement pump {kPa}, N is a counter reading {pulses/sec}, Z is the number of pulses per revolution, $T_b$ is a standardizing temperature {K°}, and $P_b$ is a standardizing pressure {kPa}. The instantaneous standard flow rate through the displacement pump 13 (e.g., in m2/min) is then determined in accordance with equation (7) where $T_o$ is a calibration temperature {K°}, $T_n$ is a standardizing temperature based on environmental regulations {K°}, $P_o$ is a calibration pressure {kPa}, and $P_n$ is a standardizing pressure based on environmental regulations {kPa}. The instantaneous standard flow rate through the ambient air probe (e.g., in m2/min) is determined in accordance with equation (8) where L is the instantaneous flow rate through the ambient air probe {m2/min}. The standard exhaust gas volume is then determined in accordance with equations (9). Lastly, the dilution factor is determined in accordance with equation (10).

$$Q = \left( D - M \times \frac{\sqrt{\frac{\Delta P}{P + \Delta P}}}{A - B \times \Delta P} \right) \times \frac{N}{Z} \times \frac{P \times T_b}{T \times P_b} \quad (6)$$

$$Q_n = Q \times \frac{P_o \times T_n}{T_o \times P_n} \quad (7)$$

$$L_n = L \times \frac{P_o \times T_n}{T_o \times P_n} \quad (8)$$

$$A_n = Q_n - L_n \quad (9)$$
$$A_n = (Q - L) \times \frac{P_o \times T_n}{T_o \times P_n}$$

$$V = \frac{Q_n}{A_n} \quad (10)$$

While the individual components of this analyzer are known per se, one skilled in the art could not have expected the combination arrangement in accordance with the invention, as shown in the drawing, to be serviceable in the absence of invention since its basic design differs in principle from the prior-art CVS analyzers.

What is claimed is:

1. In an exhaust-gas analyzer including a sampling tube, a gas feed pump disposed downstream of said sampling tube, a flowmeter disposed in an air line upstream of said gas feed pump, a venturi valve disposed between said gas feed pump and said sampling tube, and a pressure and temperature measurement unit disposed between said venturi valve and said sampling tube, a method for analyzing a mixture of exhaust gas comprising the steps of:
   a) producing a first measurement signal by passing ambient air through said flow meter;
   b) feeding a mixture of exhaust and ambient air into said sampling tube;
   c) producing a second measurement signal by monitoring, in the pressure and temperature unit, a pressure and temperature of said mixture of exhaust and ambient air in the sampling tube;
   d) determining the instantaneous flow rate through said venturi nozzle based on said second measurement signal;
   e) determining the instantaneous standard flow rate through said venturi nozzle based on the instantaneous flow rate determined in step d);
   f) determining the instantaneous standard flow rate of ambient air based in part on said first measurement signal;
   g) determining the standardized exhaust gas volume based on the instantaneous standard flow rate through the venturi determined in step e) and the instantaneous standard flow rate of ambient air determined in step f); and
   h) determining a dilution factor based on the instantaneous standard flow rate through the venturi determined in step e) and on the standardized exhaust gas volume determined in step g).

2. The method of claim 1 wherein the step of determining the instantaneous flow rate through said venturi nozzle, Q, is made in accordance with the following equation, $$Q = K \times P \times T^{-0.5}$$

wherein K is a correction factor, P is the instantaneous absolute pressure, and T is the instantaneous temperature.

3. The method of claim 2 wherein the step of determining the instantaneous standard flow rate through said venturi nozzle, $Q_n$, made in accordance with the following equation $$Q_n = \frac{K \times P}{\sqrt{T}} \times \frac{P_o \times T_n}{T_o \times P_n}$$

wherein $P_o$ is a calibration pressure, $P_n$ is a standardizing pressure based on environmental regulations, $T_o$ is a calibration temperature, and $T_n$ is a standardizing temperature based on environmental regulations.

4. The method of claim 3 wherein the step of determining the instantaneous standard flow rate of ambient air, $L_n$, is made in accordance with the following equation $$L_n = L \times \frac{P_o \times T_n}{T_o \times P_n}$$

wherein L is the instantaneous flow rate through the ambient air probe.

5. The method of claim 4 wherein the step of determining the standardized exhaust gas volume, $A_n$, is made in accordance with the following equation $$A_n = Q_n - L_n$$

6. The method of claim 5 wherein the step of determining the dilution factor, V, is made in accordance with the following equation $$V = \frac{Q_n}{A_n},$$

7. In an exhaust-gas analyzer including a sampling tube, a displacement pump disposed downstream of said sampling tube, a flowmeter disposed in an air line upstream of said displacement pump, and a pressure and temperature measurement unit disposed between said displacement pump and said sampling tube, a method for analyzing a mixture of exhaust gas comprising the steps of:
   a) producing a first measurement signal by passing ambient air through said flow meter;
   b) feeding a mixture of exhaust and ambient air into said sampling tube;
   c) producing a second measurement signal by monitoring, in the pressure and temperature unit, a pressure and temperature of said mixture of exhaust and ambient air in the sampling tube;
   d) measuring a pressure differential across said displacement pump;
   e) determining the instantaneous flow rate through said displacement pump based upon said second measured signal and said measured pressure differential;
   f) determining the instantaneous standard flow rate through said displacement pump based on the instantaneous flow rate determined in step e);
   g) determining the instantaneous standard flow rate of ambient air based in part on said first measurement signal;
   h) determining the standardized exhaust gas volume based on the instantaneous standard flow rate through said displacement pump determined in step f) and the instantaneous standard flow rate of ambient air determined in step g); and
   i) determining a dilution factor based on the instantaneous standard flow rate through said displacement pump determined in step f) and on the standardized exhaust gas volume determined in step h).

8. The method of claim 7 wherein the step of determining the instantaneous flow rate through said displacement pump, Q, is made in accordance with the following equation $$Q = \left( D - M \times \frac{\sqrt{\frac{\Delta P}{P + \Delta P}}}{A - B \times \Delta P} \right) \times \frac{N}{Z} \times \frac{P \times T_b}{T \times P_b}$$

wherein where D is the rated suction volume per revolution, M is a suction volume reduction, A is the RPM of the flow stage, B is a factor of the RPM reduction, T is the instantaneous temperature, P is the instantaneous absolute pressure, $\Delta P$ is the pressure difference across the displacement pump, N is a counter reading, Z is the number of pulses per revolution, $T_b$ is a standardizing temperature, and $P_b$ is a standardizing pressure.

9. The method of claim 8 wherein the step of determining the instantaneous standard flow rate through said displacement pump, $Q_n$ is made in accordance with the following equation $$Q_n = Q \times \frac{P_o \times T_n}{T_o \times P_n}$$

wherein $T_o$ is a calibration temperature, $T_n$ is a standardizing temperature based on environmental regulations, $P_o$ is a calibration pressure, and $P_n$ is a standardizing pressure based on environmental regulations.

10. The method of claim 9 wherein the step of determining the instantaneous standard flow rate, $L_n$, of ambient air is made in accordance with the following equation $$L_n = L \times \frac{P_o \times T_n}{T_o \times P_n}$$

wherein L is the instantaneous flow rate through the ambient air probe.

11. The method of claim 10 wherein the step of determining the standardized exhaust gas volume, $A_n$, is made in accordance with the following equation $$A_n = Q_n - L_n.$$

12. The method of claim 11 wherein the step of determining the dilution factor, V, is made in accordance with the following equation $$V = \frac{Q_n}{A_n}.$$

13. An exhaust-gas analyzer comprising:
a) an air intake line having an inlet and an outlet;
b) an exhaust gas intake line having an inlet and an outlet;
c) a flowmeter, said flowmeter being disposed between said inlet and said outlet of said air intake line;
d) a stabilizing section, said stabilizing section having a first end and a second end, said first end of said stabilizing section being connected to said outlet of said air intake line and to said outlet of said exhaust gas intake line;
e) a displacement pump being connected to said second end of said stabilizing section;
f) means for withdrawing a sample, said means for withdrawing a sample being disposed between said first end and said second end of said stabilizing section;
g) a computer; and
h) a gas temperature and pressure sensor, said gas temperature and pressure sensor being disposed in said stabilizing section and providing signals to said computer.

14. The exhaust-gas analyzer of claim 13 wherein said displacement pump is a Root's blower.

15. The exhaust-gas analyzer of claim 13 wherein said displacement pump is a Root's compressor.

16. An exhaust-gas analyzer such as for emissions testing of motor-vehicle engines comprising:
a) a sampling tube into which a mixture of exhaust gas and ambient air is fed through gas lines;
b) a displacement pump disposed downstream of said sampling tube;
c) a flowmeter disposed in an air line upstream of said gas feed pump and producing first measurement signals;
d) means for measuring a pressure differential across said displacement pump;
e) a pressure and temperature measurement unit disposed between said displacement pump and said sampling tube and producing second measurement signals; and
f) a computing unit accepting said first and second measurement signals.

17. The exhaust-gas analyzer of claim 16 wherein said displacement pump is a Root's blower.

18. The exhaust-gas analyzer of claim 16 wherein said displacement pump is a Root's compressor.

* * * * *